United States Patent
Yoon

(10) Patent No.: US 9,919,706 B2
(45) Date of Patent: Mar. 20, 2018

(54) METHOD FOR ADJUSTING SPEED OF VEHICLE

(71) Applicant: Hyundai Motor Company, Seoul (KR)

(72) Inventor: Ji Hyun Yoon, Seoul (KR)

(73) Assignee: Hyundai Motor Company, Seoul (KR)

( * ) Notice: Subject to any disclaimer, the term of this patent is extended or adjusted under 35 U.S.C. 154(b) by 208 days.

(21) Appl. No.: 14/940,236

(22) Filed: Nov. 13, 2015

(65) Prior Publication Data

US 2017/0001638 A1 Jan. 5, 2017

(30) Foreign Application Priority Data

Jul. 2, 2015 (KR) .................. 10-2015-0094518

(51) Int. Cl.
*B60W 30/14* (2006.01)
*B60W 50/00* (2006.01)
*G01C 21/34* (2006.01)

(52) U.S. Cl.
CPC ...... *B60W 30/143* (2013.01); *B60W 50/0097* (2013.01); *B60W 2550/143* (2013.01);
(Continued)

(58) Field of Classification Search
CPC .......... B60W 30/143; B60W 2550/22; B60W 2550/402; B60W 50/08; B60W 10/06; B60W 10/18; B60W 2520/10; B60W 2550/20; B60W 30/00; B60W 30/188; B60W 40/09; B60W 50/10; B60W 50/14; B60W 10/02
See application file for complete search history.

(56) References Cited

U.S. PATENT DOCUMENTS

| | | | |
|---|---|---|---|
| 2009/0041358 A1* | 2/2009 | Tanaka | G01C 21/32 382/195 |
| 2012/0148094 A1* | 6/2012 | Huang | G06K 9/00785 382/103 |

(Continued)

FOREIGN PATENT DOCUMENTS

| | | | | |
|---|---|---|---|---|
| DE | 10327255 A1 * | 2/2004 | ......... | B60K 31/0058 |
| JP | H11-39592 A | 2/1999 | | |

(Continued)

OTHER PUBLICATIONS

DE10327255_machine translation.pdf, Jun. 17, 2003.*

*Primary Examiner* — Jelani A Smith
(74) *Attorney, Agent, or Firm* — Brinks Gilson & Lione

(57) ABSTRACT

Disclosed herein are methods for automatically adjusting a speed of a vehicle capable of allowing the vehicle to arrive at a destination within a time desired by a driver in consideration of a desired arrival time to the destination, a distance to the destination, a current traffic volume, or the like. A method for adjusting a speed of a vehicle in a system for adjusting a speed of a vehicle may include a driver of the vehicle setting a destination, and the system for adjusting a speed of a vehicle searching a path to the destination and calculating a distance to the destination and a current traffic volume to calculate an arrival time to the destination. The method may further include the driver setting a desired arrival time to the destination, and the system for adjusting a speed of a vehicle deciding whether or not the vehicle arrives at the destination within the desired arrival time.

5 Claims, 3 Drawing Sheets

(52) U.S. Cl.
CPC . *B60W 2550/402* (2013.01); *B60W 2720/103* (2013.01); *G01C 21/3492* (2013.01)

(56) References Cited

U.S. PATENT DOCUMENTS

| | | | |
|---|---|---|---|
| 2014/0088849 A1* | 3/2014 | Ham | B60W 30/143 701/70 |
| 2015/0360688 A1* | 12/2015 | Tanaka | B60W 10/06 701/93 |
| 2016/0244062 A1* | 8/2016 | Tudosie | B60W 50/0097 |

FOREIGN PATENT DOCUMENTS

| | | |
|---|---|---|
| JP | 2013-200158 A | 10/2013 |
| JP | 2014-240233 A | 12/2014 |
| KR | 1020140059520 A | 5/2014 |
| KR | 1020140111081 A | 9/2014 |
| KR | 1020150009725 A | 1/2015 |

\* cited by examiner

METHOD FOR ADJUSTING SPEED OF VEHICLE

CROSS-REFERENCE TO RELATED APPLICATION

This application claims the benefit of priority to Korean Patent Application No. 10-2015-0094518, filed on Jul. 2, 2015, the entirety of which is hereby incorporated by reference.

FIELD

The present disclosure relates to a method for adjusting a speed of a vehicle, and more particularly, to a technology capable of allowing a vehicle to arrive at a destination in consideration of an arrival time desired by a driver.

BACKGROUND

The statements in this section merely provide background information related to the present disclosure and may not constitute prior art.

Recently, in accordance with the rapid development of a vehicle related technology, a vehicle system significantly improving convenience of a driver has been commercialized in various patterns. As a typical function of convenience functions of a vehicle, there is a smart cruise control (SCC) system, which is a convenience apparatus providing freedom in a longitudinal direction to the driver by automatically driving and braking the vehicle so that a speed of the vehicle is maintained at a speed set by the driver.

In addition, as a convenience function sensing a driving path, there is a lane departure warning (LDW) system, which is a kind of vision system using a camera sensor and is configured to recognize a lane of a road using a camera to give the driver a warning when the vehicle is about to depart from the lane due to sleepiness or carelessness of the driver.

The above-mentioned two systems, which are systems that have been currently commercialized, have been mounted as driver convenience or safety systems in high class vehicles.

In addition, recently, a technology of providing a function of allowing the driver to set a predetermined speed or constantly maintaining a road speed limit to the driver has also appeared.

Further, a technology of allowing the driver to set a desired time in which he/she will arrive at a destination in order to arrive at the destination within a specified time or allowing the vehicle to automatically adjust a speed of the vehicle by reflecting a traffic volume, or the like has been required.

SUMMARY

The present disclosure has been made to solve the above-mentioned problems occurring in the prior art while advantages achieved by the prior art are maintained intact.

An aspect of the present disclosure provides a method for automatically adjusting a speed of a vehicle capable of allowing the vehicle to arrive at a destination within a time desired by a driver in consideration of a desired arrival time at the destination, a distance to the destination, a current traffic volume, or the like.

Other objects and advantages of the present disclosure may be understood by the following description and will be more clearly appreciated by exemplary forms of the present disclosure. It may be easily appreciated that objects and advantages of the present disclosure may be realized by means mentioned in the claims and a combination thereof.

According to an exemplary form of the present disclosure, a method for adjusting a speed of a vehicle in a system for adjusting a speed of a vehicle includes, a driver of the vehicle setting a destination, the system for adjusting a speed of a vehicle searching a path to the destination and calculating a distance to the destination and a current traffic volume to calculate an arrival time to the destination, the driver setting a desired arrival time to the destination, and the system for adjusting a speed of a vehicle deciding whether or not the vehicle arrives at the destination within the desired arrival time, and further includes calculating a current driving speed of the vehicle in the case in which it is decided that the vehicle arrives at the destination within the desired arrival time and allowing the driver to reset the desired arrival time to the destination in the case in which it is decided that the vehicle does not arrive at the destination within the desired arrival time.

The current driving speed of the vehicle may be calculated according to the following Equation 2 and Equation 3:

$$v_{cur}=v_{set} \text{ or } v_{limit} \text{ if } t_{dest}<t_{desired} \qquad \text{[Equation 2]}$$

$$v_{cur}=v_{set}+v_{adj} \qquad \text{[Equation 3]}$$

where $v_{cur}$ is the current driving speed of the vehicle, $v_{set}$ is a speed set by the driver, $v_{limit}$ is a speed limit on a road, $t_{dest}$ is a minimum expected time required for the vehicle to arrive at the destination from a current position, $t_{desired}$ is an arrival time desired by the driver, and $v_{adj}$ is a speed automatically adjusted and added in order for the vehicle to arrive at the destination in the arrival time desired by the driver.

In the case in which it is decided that the vehicle arrives at the destination within the desired arrival time, after the current driving speed is calculated, the speed of the vehicle may be maintained at the current driving speed or be maintained at a speed set by the driver or a road speed limit.

When the road speed limit is higher than the current driving speed calculated in the calculating of the current driving speed of the vehicle, the system for adjusting a speed of a vehicle may maintain the speed of the vehicle at the road limit speed or inform the driver whether or not the desired arrival time to the destination is changed.

In the allowing of the driver to reset the desired arrival time to the destination, in the case in which the driver does not reset the desired arrival time to the destination, general smart control cruise (SCC) driving may be performed or the driver may directly drive the vehicle to adjust the speed.

Further areas of applicability will become apparent from the description provided herein. It should be understood that the description and specific examples are intended for purposes of illustration only and are not intended to limit the scope of the present disclosure.

DRAWINGS

The above and other objects, features and advantages of the present disclosure will be more apparent from the following detailed description taken in conjunction with the accompanying drawings.

DETAILED DESCRIPTION

Advantages and features of the present disclosure and methods accomplishing them will become apparent from exemplary forms described below in detail with reference to the accompanying drawings. However, the present disclosure is not limited to exemplary forms described herein, but may be implemented in other forms. These exemplary forms are provided in order to describe the present disclosure in detail so that those skilled in the art to which the present disclosure pertains may easily practice the spirit of the present disclosure.

In the accompanying drawings, exemplary forms of the present disclosure are not limited to illustrated specific forms, but are exaggerated for the purpose of clarity. Although specific terms have been used in the present specification, they are used in order to describe the present disclose and are not used in order to limit the meaning or the scope of the present disclosure, which is disclosed in the appended claims.

In the present specification, a term 'and/or' is used as the meaning including at least one of components arranged before and after the term. In addition, terms 'connected/coupled' are used as the meaning including that any component is directly connected to another component or is indirectly connected to another component through the other component. Unless explicitly described to the contrary, a singular form includes a plural form in the present specification. In addition, components, steps, operations, and elements mentioned by terms 'include' or 'including' used in the present specification mean the existence or addition of one or more other components, steps, operations, and elements.

Hereinafter, an exemplary form of the present disclosure will be described in detail with reference to the accompanying drawings.

Figure 1:
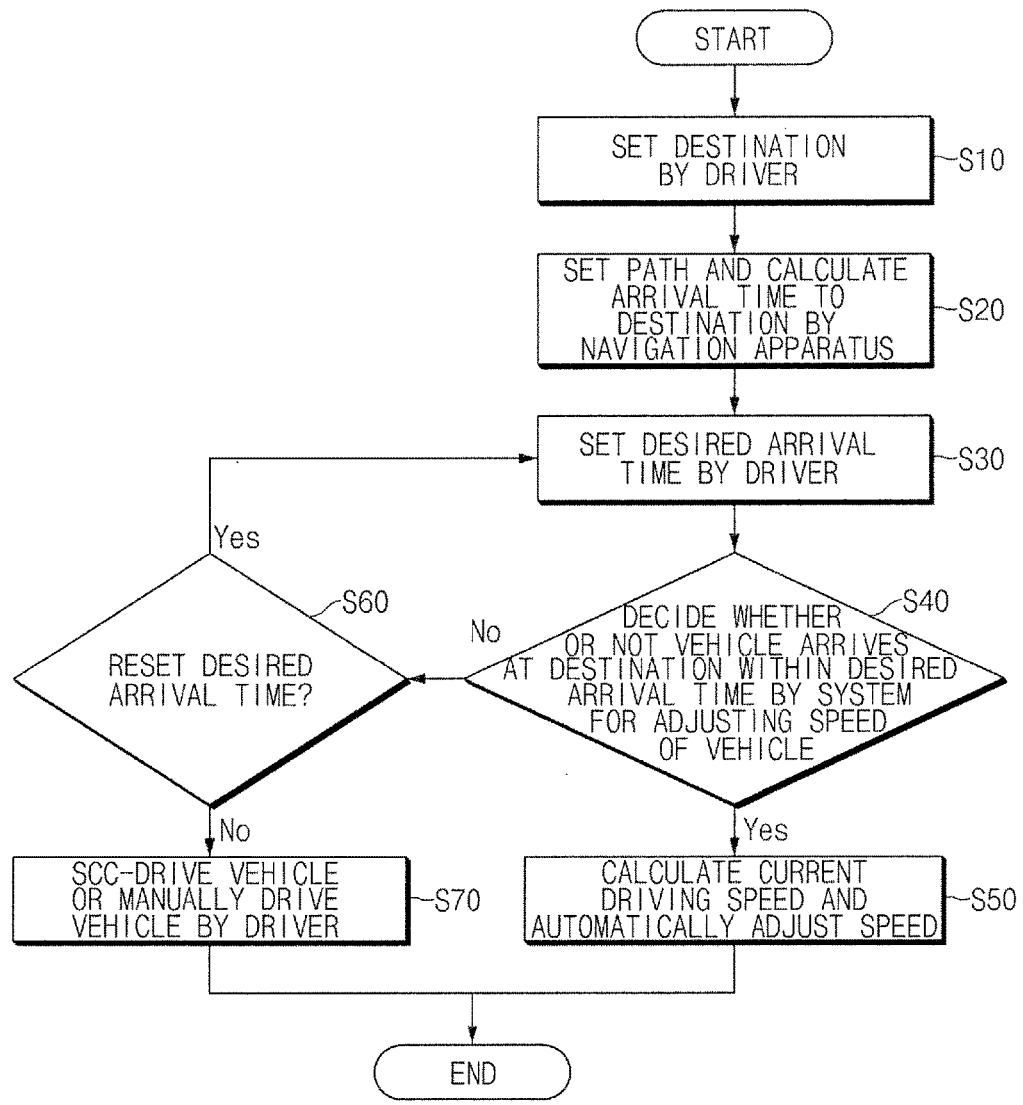
FIG. 1 is a flow chart for describing a method for adjusting a speed of a vehicle.

FIG. 1 is a flow chart for describing a method for adjusting a speed of a vehicle in a system for adjusting a speed of a vehicle.

Here, the system for adjusting a speed of a vehicle includes a smart cruise control (SCC) system. The SCC system means a convenience apparatus providing freedom in a longitudinal direction to a driver by automatically driving and braking the vehicle so that a speed of the vehicle is maintained at a set speed set by the driver.

Referring to FIG. 1, a driver gets in a vehicle and sets a desired destination using an audio video navigation (AVN) apparatus (S10). Here, the AVN apparatus may include a navigation apparatus, a cluster, a head up display (HUD), or the like.

Next, the navigation apparatus of the system for adjusting a speed of a vehicle searches a path to the destination and calculates a distance to the destination and a current traffic volume to calculate an arrival time to the destination (S20).

Next, the driver sets a desired arrival time to the destination (S30).

Next, the system for adjusting a speed of a vehicle decides whether or not the vehicle may arrive at the destination set by the driver within the desired arrival time (S40).

Here, in the case in which the vehicle may arrive at the destination within the desired arrival time, the system for adjusting a speed of a vehicle calculates a current driving speed of the vehicle and automatically adjusts a speed of the vehicle (S50).

Here, the system for adjusting a speed of a vehicle may maintain the speed of the vehicle at the current driving speed or maintain the speed of the vehicle at a speed set by the driver or a road speed limit after calculating the current driving speed of the vehicle.

In addition, when the calculated current driving speed is higher than the road speed limit, the system for adjusting a speed of a vehicle may maintain the speed of the vehicle at the road speed limit or inform the driver whether or not the desired arrival time to the destination is to be changed.

Here, the current driving speed of the vehicle is calculated by the following Equation 1:

$$t_{dest} = \sum_{i=1}^{num\ of\ segments} \left( \frac{\text{length of } i_{th} \text{ segment}}{v_{max} \text{ of } i_{th} \text{ segment}} \right) \quad \text{[Equation 1]}$$

In Equation 1, $t_{dest}$ means a minimum expected time required for the vehicle to arrive at the destination from a current position, num of segments means the number of segments of a driving path of the vehicle from the current position to the destination, and $v_{max}$ means a drivable maximum speed in which a speed limit of an i-th segment and a traffic volume are considered.

For example, when the speed limit of the i-th segment is 60 Kph (Kilometer per hour), but a drivable speed in which a current traffic volume is considered is 50 Kph, $v_{max}$ is 50 Kph. Here, the segments are partial paths generated by dividing the path in a predetermined length unit.

In Equation 1, a time ($t_{dest}$) required for the vehicle to arrive at the destination is calculated by summing up the respective times required when the vehicle is driven in the respective segments at a drivable maximum speed.

$$v_{cur} = v_{set} \text{ or } v_{limit} \text{ if } t_{dest} < t_{desired} \quad \text{[Equation 2]}$$

$$v_{cur} = v_{set} + v_{adj} \quad \text{[Equation 3]}$$

In Equation 2, $v_{cur}$ means a current driving speed required for the vehicle to arrive at the destination within the time desired by the driver, $v_{set}$ means a speed set by the driver in an SCC function, $v_{limit}$ means a speed limit on a road, $t_{desired}$ means an arrival time desired by the driver, and $v_{adj}$ means a speed automatically adjusted and added in order for the vehicle to arrive at the destination in the arrival time desired by the driver.

Equation 2 means a case in which the current driving speed ($v_{cur}$) is set to correspond to the speed ($v_{set}$) set by the driver or the speed limit ($v_{limit}$) on the road when a time ($t_{dest}$) required for the vehicle to arrive at the destination is faster than the arrival time ($t_{desired}$) desired by the driver.

On the other hand, Equation 3 means an opposite case to the case of Equation 2, that is, a case in which the driver adjusts the speed to accelerate the vehicle from the speed set by the driver so as for the vehicle to arrive at the destination in the desired time. The current driving speed of the vehicle may be calculated by reflecting all of the distance to the destination, the current traffic volume on the path to the destination, and the speed limit and reflecting the arrival time desired by the driver.

However, in the case in which the vehicle may not arrive at the destination within the desired arrival time, the system for adjusting a speed of a vehicle requests the driver to reset the desired arrival time to the destination (S60).

Next, in the case in which the driver does not reset the desired arrival time to the destination even though the system for adjusting a speed of a vehicle requests the driver to reset the desired arrival time to the destination, general SCC driving is performed or the driver directly drives the vehicle to adjust the speed (S70).

That is, in the case in which the vehicle may not arrive at the destination within the arrival time desired by the driver, the system for adjusting a speed of a vehicle adjusts the speed of the vehicle from the current driving speed of the vehicle to accelerate the vehicle.

$$v_{adj} = K * \frac{d_{dest}}{(t_{dest} - t_{desired})} \qquad \text{[Equation 4]}$$

In Equation 4, $v_{adj}$ means a speed automatically adjusted and added in order for the vehicle to arrive at the destination in the arrival time desired by the driver, K means a gain value obtained by a driving experiment (data) of the vehicle, and $d_{dest}$ means a distance from the current position of the vehicle to the destination.

Figure 2:
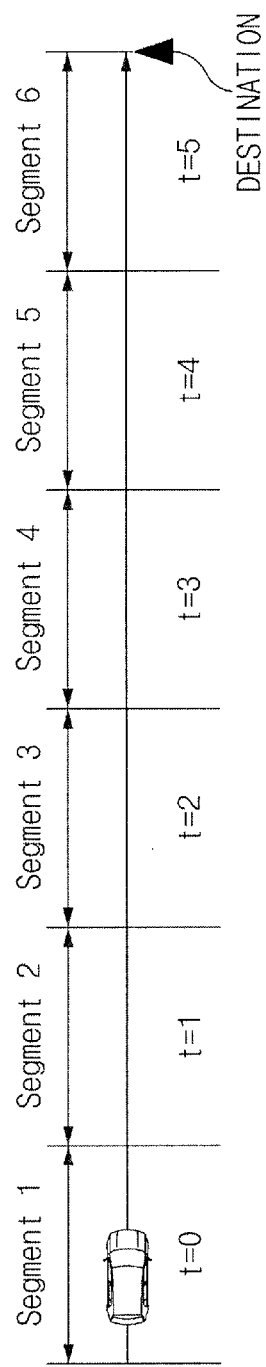
FIG. 2 is a view for describing a state in which a system for adjusting a speed of a vehicle is initialized in a situation in which a destination of the vehicle is set.

FIG. 2 is a view for describing a state in which a system for adjusting a speed of a vehicle is initialized in a situation in which a destination of the vehicle is set.

Referring to FIG. 2, the system for adjusting a speed of a vehicle may divide a path from the current position of the vehicle to the destination into segments and automatically adjust the speed of the vehicle depending on the divided segments.

For example, when the path from the current position of the vehicle to the destination is divided into segments 1 to 6 and a length of each of the segments is 10 km, a length of the path from the current position of the vehicle to the destination is a total of 60 km.

Here, when a speed limit of each segment is 60 kph, an arrival time calculated by the navigation apparatus of the device is one hour (60 km/kph).

However, when the speed of the vehicle is adjusted under the assumption that the arrival time desired by the driver is a time within one hour, the arrival time may be recalculated.

For example, in the case in which times corresponding to the respective segments depending on the path from the current position to the destination are t=0 to t=5, when a driving time of the vehicle in a segment 5 is 15 minutes, the remaining driving time is 45 minutes obtained by subtracting the driving time (15 minutes) of the vehicle in the segment 5 from a total of one hour.

When the path from the current position to the destination is divided by the remaining time, a current speed of the vehicle may be calculated to be 67 kph (50 km/45 minutes). That is, when the speed of the vehicle is maintained at the calculated speed thereof, the vehicle may arrive at the destination in the arrival time desired by the driver.

Figure 3:
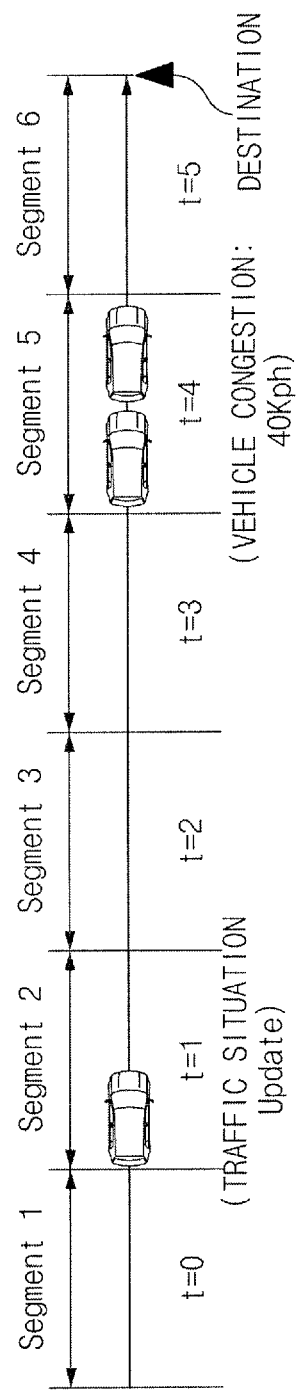
FIG. 3 is a view for describing a driving situation of the vehicle after a new traffic situation in front of the vehicle is updated at t=1 (segment 2) after a predetermined time elapses in FIG. 2.

FIG. 3 is a view for describing a driving situation of the vehicle after a new traffic situation in front of the vehicle is updated at t=1 (segment 2) after a predetermined time elapses in FIG. 2.

Referring to FIG. 3, the system for adjusting a speed of a vehicle may divide the path from the current position of the vehicle to the destination into segments and automatically adjust the speed of the vehicle depending on the divided segments.

For example, when the path from the current position of the vehicle to the destination is divided into segments 1 to 6 and a length of each of the segments is 10 km, a length of the path from the current position of the vehicle to the destination is a total of 60 km.

Here, when a speed limit of each segment is 60 kph, an arrival time calculated by the navigation apparatus of the device is one hour (60 km/60 kph).

However, when the speed of the vehicle is adjusted under the assumption that the arrival time desired by the driver is a time within one hour, the arrival time may be recalculated.

For example, in the case in which times corresponding to the respective segments depending on the path from the current position to the destination are t=0 to t=5, when the vehicle is driven to be positioned at a segment 2 and t=1, that is, when the remaining distance is 50 km after the vehicle is driven for 10 minutes from t=0 and a driving expected time of the vehicle in a segment 5 is 15 minutes, the remaining driving time is 35 minutes obtained by subtracting the driving expected time (15 minutes) of the vehicle in the segment 5 from a total of 50 minutes.

When the path from the current position to the destination is divided by the remaining time, a current speed of the vehicle may be calculated to be 68 kph (40 km/35 minutes). That is, when the speed of the vehicle is adjusted to the calculated speed and the vehicle is driven at the calculated speed, the vehicle may arrive at the destination in the arrival time desired by the driver.

As described above, according to an exemplary form of the present disclosure, the speed of the vehicle is automatically adjusted so that the vehicle may arrive at the destination within the time desired by the driver, thereby making it possible to promote convenience of the driver.

In addition, according to an exemplary form of the present disclosure, in the case in which the automatically adjusted speed of the vehicle exceeds a set range, the driver may manually drive the vehicle at the set speed.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for adjusting a speed of a vehicle in a system for adjusting a speed of a vehicle, comprising:
   receiving, by the system, a destination;
   determining, by the system, a path to the destination;
   calculating a distance to the destination and a current traffic volume;
   determining a predicted arrival time to the destination;
   receiving, by the system, a desired arrival time to the destination; and
   determining, by the system, whether the predicted arrival time is within the desired arrival time;
   when the predicted arrival time is within the desired arrival time:
      determining a driving speed setting of the vehicle calculated to arrive at the destination by the desired arrival time based on obtained conditions; and
      adjusting a driving speed of the vehicle to the driving speed setting;
   when the predicted arrival time is not within the desired arrival time, resetting the desired arrival time to an updated desired arrival time.

2. The method for adjusting a speed of a vehicle according to claim 1, wherein the driving speed setting of the vehicle is calculated based on the following Equation 2 and Equation 3:

$$v_{cur} = v_{set} \text{ or } v_{limit} \text{ if } t_{dest} < t_{desired} \quad \text{[Equation 2]}$$

$$v_{cur} = v_{set} + v_{adj} \quad \text{[Equation 3]}$$

where $v_{cur}$ is the driving speed setting of the vehicle, $v_{set}$ is a speed set by the driver, $v_{limit}$ is a speed limit on a road, $t_{dest}$ is a minimum expected time required for the vehicle to arrive at the destination from a current position, $t_{desired}$ is an arrival time desired by the driver, and $v_{adj}$ is a speed automatically adjusted and added in order for the vehicle to arrive at the destination at the arrival time desired by the driver.

3. The method for adjusting a speed of a vehicle according to claim 1, further comprising:

when it is determined that the predicted arrival time is within the desired arrival time, after determining the driving speed setting, adjusting the speed of the vehicle to the driving speed setting, or a speed set by the driver, or a road speed limit.

4. The method for adjusting a speed of a vehicle according to claim 3, further comprising:

when the driving speed setting is higher than the road speed limit, adjusting the speed of the vehicle to the road limit speed or informing the driver whether the desired arrival time to the destination is to be changed.

5. The method for adjusting a speed of a vehicle according to claim 1, wherein resetting the desired arrival time comprises:

when a driver input for resetting the desired arrival time is not received, performing general smart control cruise (SCC) driving or allowing the driver to directly drive the vehicle to adjust the speed.

* * * * *